US008549428B2

(12) United States Patent
Pomper (10) Patent No.: US 8,549,428 B2
(45) Date of Patent: Oct. 1, 2013

(54) PORTABLE IR THERMOMETER HAVING GRAPHICAL USER DISPLAY AND INTERFACE

(75) Inventor: Kenneth A. Pomper, Aptos, CA (US)

(73) Assignee: Fluke Corporation, Everett, WA (US)

( * ) Notice: Subject to any disclaimer, the term of this patent is extended or adjusted under 35 U.S.C. 154(b) by 876 days.

(21) Appl. No.: 11/965,945

(22) Filed: Dec. 28, 2007

(65) Prior Publication Data

US 2009/0172591 A1    Jul. 2, 2009

(51) Int. Cl.
*G06F 3/00* (2006.01)
*G06F 9/00* (2006.01)
*G06F 17/00* (2006.01)

(52) U.S. Cl.
USPC .......................................... 715/810; 715/764

(58) Field of Classification Search
USPC .................................................. 715/810, 764
See application file for complete search history.

(56) References Cited

U.S. PATENT DOCUMENTS

| | | | | |
|---|---|---|---|---|
| 4,634,294 | A * | 1/1987 | Christol et al. ............... | 374/170 |
| 4,821,211 | A * | 4/1989 | Torres ........................... | 715/853 |
| 4,895,164 | A * | 1/1990 | Wood ............................ | 600/549 |
| 5,384,576 | A * | 1/1995 | Tashiro et al. ................ | 345/3.1 |
| 5,640,015 | A | 6/1997 | Kienitz et al. | |
| 5,725,308 | A * | 3/1998 | Smith et al. .................... | 374/169 |
| 5,839,821 | A * | 11/1998 | LeZotte ........................ | 362/253 |
| 6,234,669 | B1 | 5/2001 | Kienitz et al. | |
| 7,390,124 | B2 * | 6/2008 | Kienitz ......................... | 374/131 |
| 2005/0030290 | A1 * | 2/2005 | de Brebisson ................ | 345/169 |
| 2006/0079739 | A1 * | 4/2006 | Chen Wang et al. .......... | 600/300 |

FOREIGN PATENT DOCUMENTS

EP    1909085 A2 *    4/2008

OTHER PUBLICATIONS

Users Manual entitled FLUKE Ti20 Thermal Imager, Jan. 2006.

* cited by examiner

*Primary Examiner* — Namitha Pillai
*Assistant Examiner* — Sabrina Greene
(74) *Attorney, Agent, or Firm* — Christensen O'Connor Johnson Kindness PLLC (57) ABSTRACT

A portable noncontact thermometer comprising a hand-held housing defining an aperture for ingress of incident thermal energy from a target location. A thermometer module includes a noncontact thermal energy detector impinged by the incident thermal energy. The thermometer module further includes a microcontroller operative to interpret electrical signals derived from an output of the noncontact thermal energy detector so as to determine temperature at the target location. A graphical display device, such as an LCD dot matrix display device, is fixed with respect to the housing. The display device is capable of providing a graphical user interface having multiple screens variously showing numbers, text and functional icons. Preferably, the screens will display function tabs located adjacent to corresponding buttons on the housing. The tabs will change depending on the varying function that may be implemented by pressing a respective button. The thermometer also includes circuitry, which include the microcontroller, in electrical communication with the graphical display device so as to produce the graphical user interface.

14 Claims, 13 Drawing Sheets

PORTABLE IR THERMOMETER HAVING GRAPHICAL USER DISPLAY AND INTERFACE

BACKGROUND OF THE INVENTION

The present invention relates generally to portable IR thermometers. More particularly, the invention relates to a portable IR thermometer having a graphical user display and interface.

Portable infrared (IR) thermometers allow a user to ascertain the temperature of a remote target using a point and click technique. These instruments are commonly utilized for purposes ranging from automotive diagnostics to food safety. Single point IR thermometers with digital displays have historically been implemented using a fixed-segment LCD or LED display. This creates some difficulty to implement complex functions because it necessitates multiple control panel buttons and/or a complicated user interface.

Various details regarding the construction and operation of noncontact thermometers may be discerned from U.S. Pat. Nos. 4,634,294, 5,640,015 and 6,234,669, each of which is incorporated herein by reference in its entirety.

SUMMARY OF THE INVENTION

According to one aspect, the present invention provides a portable noncontact thermometer comprising a hand-held housing defining an aperture for ingress of incident thermal energy from a target location. A thermometer module including a noncontact thermal energy detector is also provided. The thermometer module further includes a microcontroller operative to interpret electrical signals derived from an output of the noncontact thermal energy detector so as to determine temperature at the target location. A graphical display device, such as an LCD dot matrix display device, is fixed with respect to the housing. The display device is capable of providing a graphical user interface having multiple screens variously showing numbers, text and functional icons. The thermometer also includes circuitry, which may comprise the microcontroller itself, in electrical communication with the graphical display device so as to produce the graphical user interface. The functional icons may include icons indicating laser pointer activation and noncontact temperature measurement in progress.

A plurality of function buttons may be located on the housing adjacent to the graphical display device. A function implemented by each of the function buttons may vary in accordance with the multiple screens of the graphical user interface. For example, the multiple screens of the graphical user interface will preferably follow a menu tree selectable by a user.

Preferably, the thermometer may further comprise a memory having a plurality of memory locations in which respective temperature measurements may be stored. In such embodiments, the contents of the memory locations are preferably selectable using the graphical user interface. In addition, embodiments are contemplated wherein the graphical user interface is adapted to display screens in a respective one of a plurality of languages as selected by a user. The graphical user interface may also be adapted to show selected emissivity and alarm status.

Additional aspects of the present invention, including various combinations and subcombinations of the disclosed elements, will be apparent from the remainder of the specification.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Figure 1:
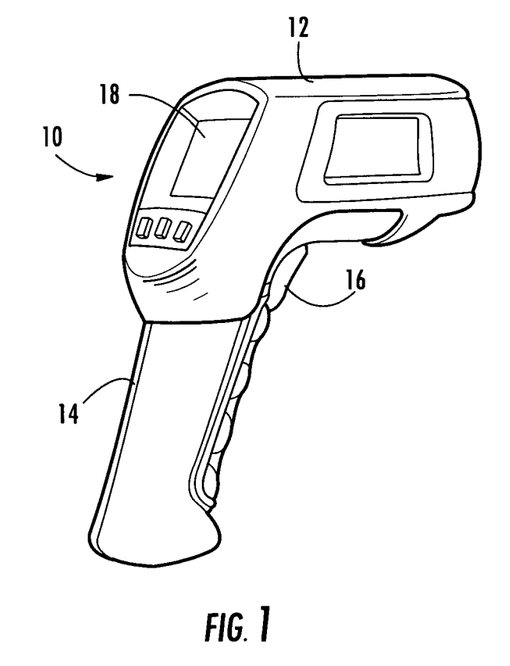
FIG. 1 is a perspective view of a portable IR thermometer constructed in accordance with the present invention.
Figure 2:
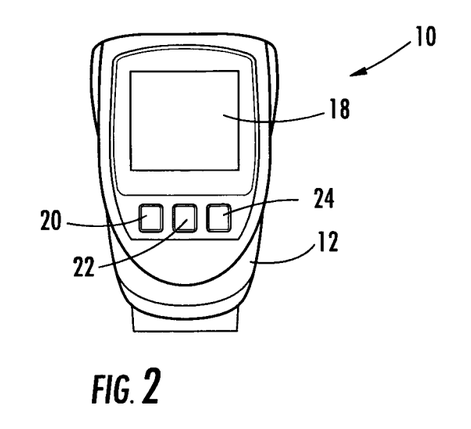
FIG. 2 is a rear view of the thermometer of FIG. 1 showing the graphical display device.

FIGS. 1 and 2 illustrate an exemplary hand-held thermometer 10 in accordance with principles of the present invention. Thermometer 10 includes an internal detector which collects energy radiated from a selected target. The energy, typically in the form of infrared (IR) radiation, is isolated and focused on the detector. The detector converts the energy into an electrical signal which is then internally processed to yield a temperature value.

As shown, thermometer 10 includes a housing 12 in which various internal components are located. While any suitable material can be utilized, housing 12 is preferably formed of a rigid high impact plastic material. As shown, housing 12 includes a handle 14 on which a trigger 16 is located. Trigger 16 places the thermometer in a "scan" (or active measurement mode). A laser diode may be provided to project a dot of light forward of the thermometer to facilitate aiming.

As indicated at 18, a graphical display device is preferably located at the rear of thermometer 10. In this case, a variety of information is shown on display device 18, including a reading of the target temperature. Various functions of thermometer 10 are controlled by buttons 20, 22 and 24.

Figure 3:
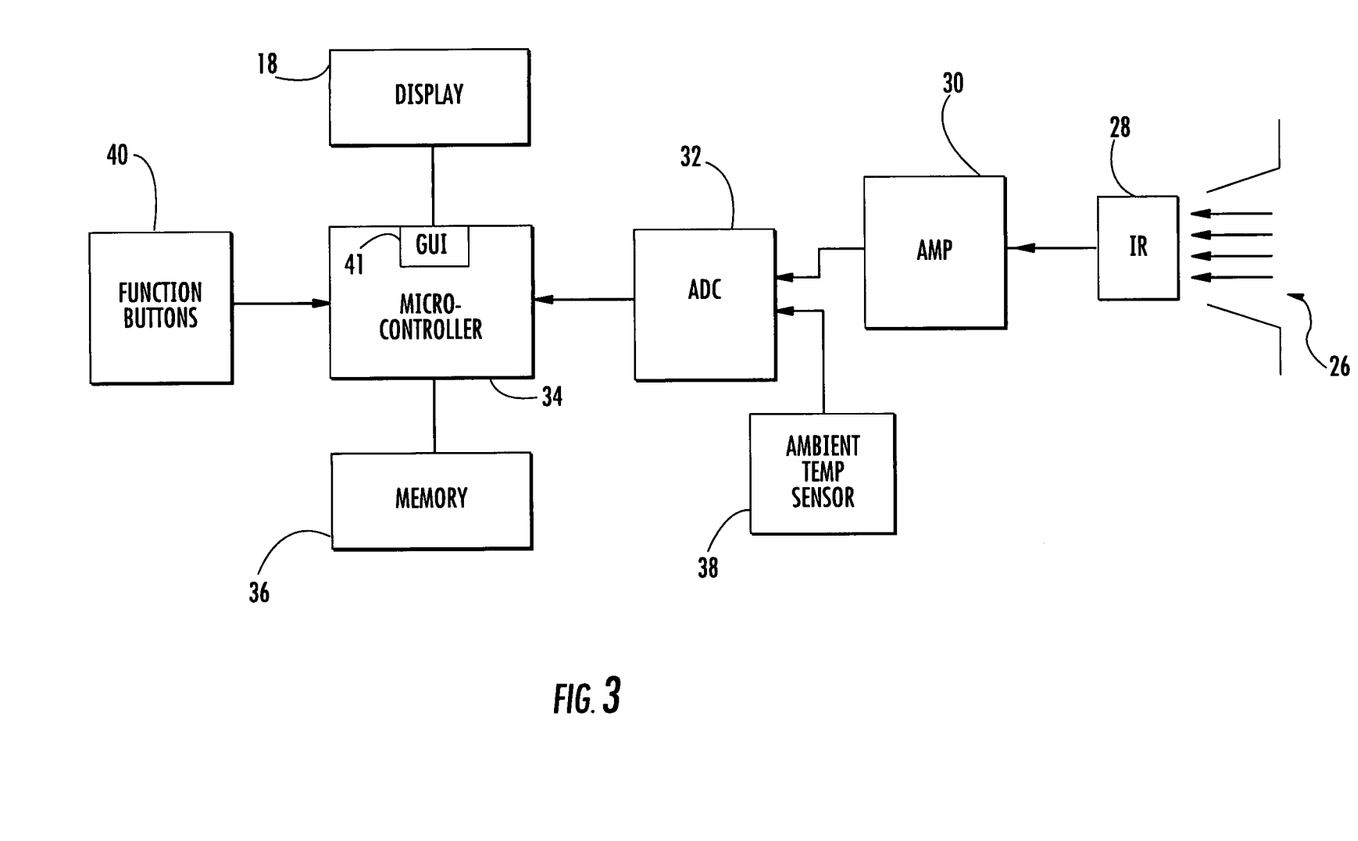
FIG. 3 is a diagrammatic representation showing certain internal components of the thermometer of FIG. 1.

Certain internal components of thermometer 10 will be explained with reference to FIG. 3. Thermal energy from a selected target passes through an aperture 26 defined in housing 12, where it is directed by optics to an IR detector 28. The output of detector 28 is fed to an amplifier 30, and then to analog-to-digital (A/D) converter 32. The digital signal resulting from A/D converter 32 is then fed to an internal microcontroller 34. Microcontroller 34 utilizes preprogrammed algorithms to convert the digital detector data into temperature information. A memory 36 is associated with microcontroller 34 to store temperature information, along with firmware and other information (such as emissivity) utilized during operation. Detector 28 along with its associated circuitry (e.g., amplifier 30, A/D converter 32, microcontroller 34 and memory 36) can be thought of collectively as a thermometer module (whether or not they form a single physical unit). In some embodiments, the thermometer module may further include an ambient temperature sensor 38. The function buttons 20, 22 and 24 are collectively indicated at 40.

As shown, display device 18 is in electrical communication with microcontroller 34. Preferably, display device 18 may be configured as a dot matrix or other suitable graphical display which implements a graphical user interface (GUI). For example, display device 18 may be a dot matrix 98×96 pixel LCD dot matrix display in some presently preferred embodiments. A significant characteristic of a dot matrix display versus a segmented display as has been used in the past is that a dot matrix display permits use of the same display area for different things at different times. For example, the dot matrix display can variously show different menu tabs, different languages, etc. at the same coordinates at different times. With a segmented LCD, display area is "consumed" by anything that could ever appear and it can only be on or off. So, there is very limited flexibility in user interface.

As a result, the illustrated embodiment permits implementations of complex functions with a minimum of control buttons and the user can be guided towards selecting functions and inputting parameters to the thermometer. In addition, the graphical display allows for flexible display of data and inputs, and can be customized for language, font size and the like. Different operating modes can also have different screen appearances. In this embodiment, the GUI is run on microcontroller 34 (as indicated at 41).

Figure 4:
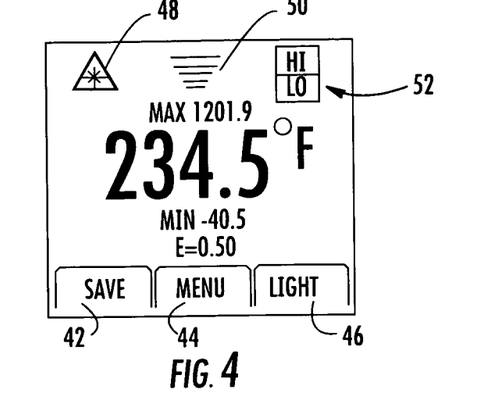
FIGS. 4 and 5 illustrate exemplary displays which may be shown on the graphical display device.
Figure 5:
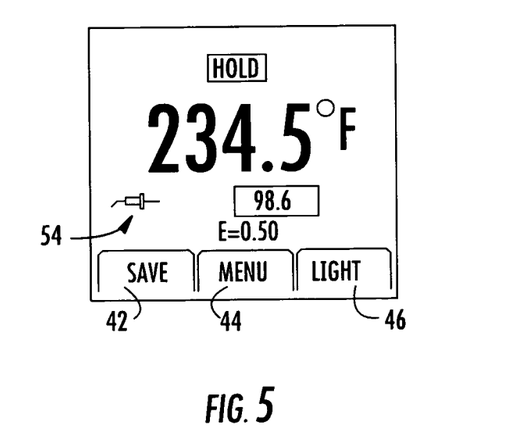

FIGS. 4 and 5 illustrate exemplary screens which may appear on display device 18 in accordance with the present invention. Referring first to FIG. 4, three tabs 42, 44 and 46 located at the bottom of the screen are proximate to buttons 20, 22 and 24, respectively. In this case, tab 42 contains the word "Save," tab 44 contains the word "Menu" and tab 46 contains the word "Light." These words indicate the function that may be performed by pressing the corresponding button. As will be apparent from the discussion below, these functions may change depending on where a particular screen appears in the GUI menu tree. Thus, there is a direct association between each button and the on-screen information located above it. The variance in the function is demonstrated/associated by the physical proximity between the button and the on-screen tab directly above it Various icons may also be displayed on the screen. In this case, for example, an icon 48 in the upper lefthand corner of the screen indicates that the thermometer's laser pointer is turned on. Another icon 50 indicates that the thermometer is being used in its measuring mode. In some presently preferred embodiments, icon 50 may be animated to give the user a greater sense that activity is occurring. For example, the horizontal lines of icon 50 may display sequentially in a rolling motion. The measured temperature (in this case, 234.5° F.) is preferably shown in large font in the center of the screen.

In this example, the screen also depicts the maximum ("MAX") and minimum ("MIN") temperatures detected by the instrument during a current scanning session. Preferably, thermometer 10 may also be configured to display an average temperature and/or a "delta" (i.e., the difference between the maximum and minimum). The current emissivity, in this case 0.50, may also be displayed on the screen.

Thermometer 10 is also preferably equipped with an alarm feature which may be set and activated using the user interface. In this case, as indicated at 52, the screen shows that both high and low alarms have been set. Specifically, thermometer 10 may be equipped with an audible indicator, such as a buzzer, that is activated when either a high or low condition is encountered. In another words, if the temperature either exceeds the high alarm level or drops below the low alarm level, a conspicuous indicator may be provided. In addition to a buzzer, the display itself can be configured to alternate between two colors (such as red and green) when an alarm condition is encountered. The words "Hi" or "Lo" on the screen may blink to inform the user of the relevant alarm condition.

FIG. 5 shows a screen as it may appear when thermometer 10 is in a "hold" mode. In this case, the last temperature measured by the infrared detector continues to display. In the hold mode, various interface functions can be accessed by the user.

In some exemplary embodiments, thermometer 10 may further include a thermocouple probe for contact measurements. In this regard, the icon at 54 indicates that the thermal probe has been connected to the unit. The temperature measured by the thermal probe (in this case, 98.6° F.) is displayed on the screen below the IR measurement. Additional icons, such as an icon indicating battery strength, may also be provided.

Figure 6A:
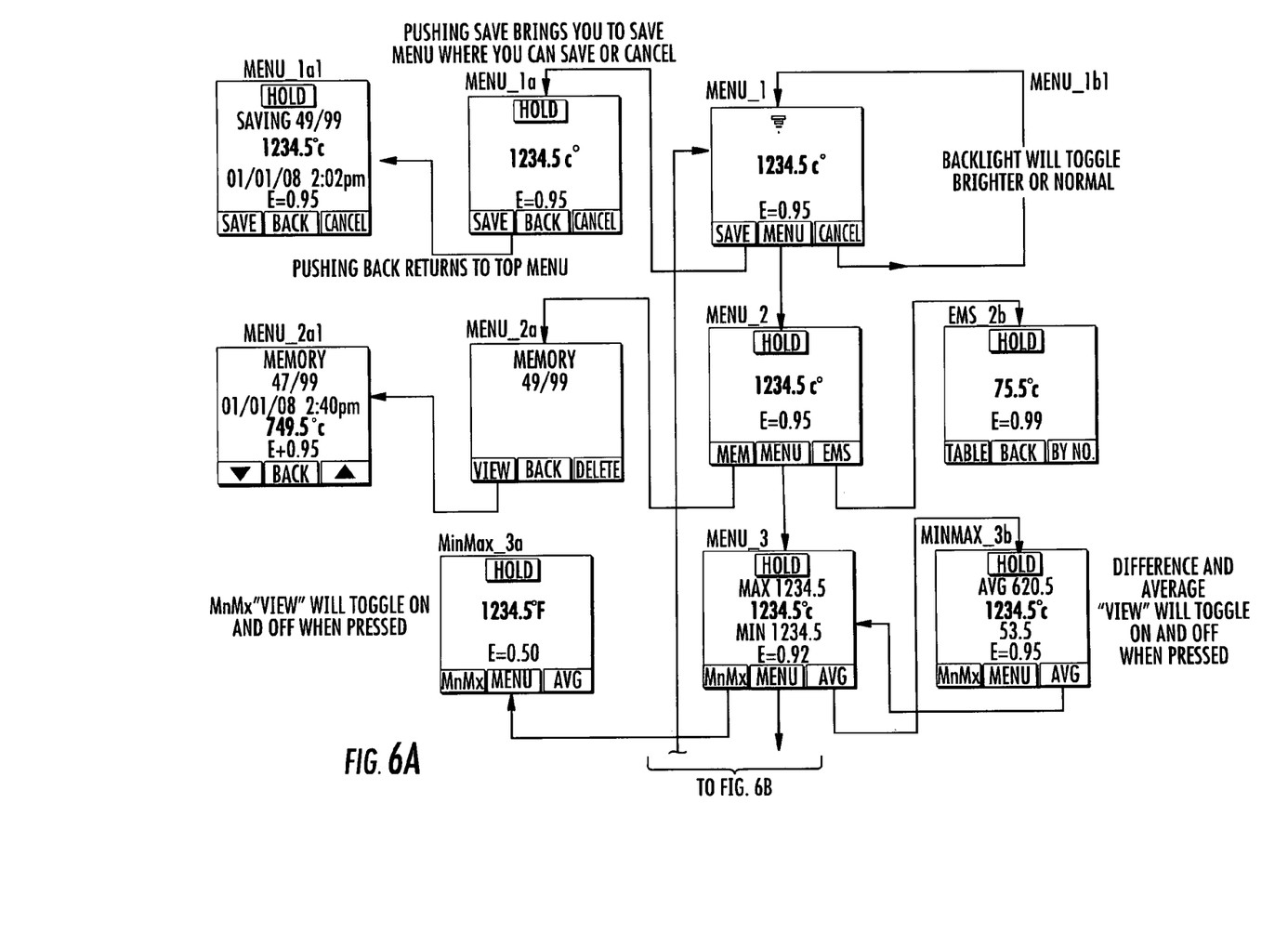
FIGS. 6A and 6B illustrate a high-level menu tree depicting various displays which can be shown on the display device depending on function.
Figure 6B:
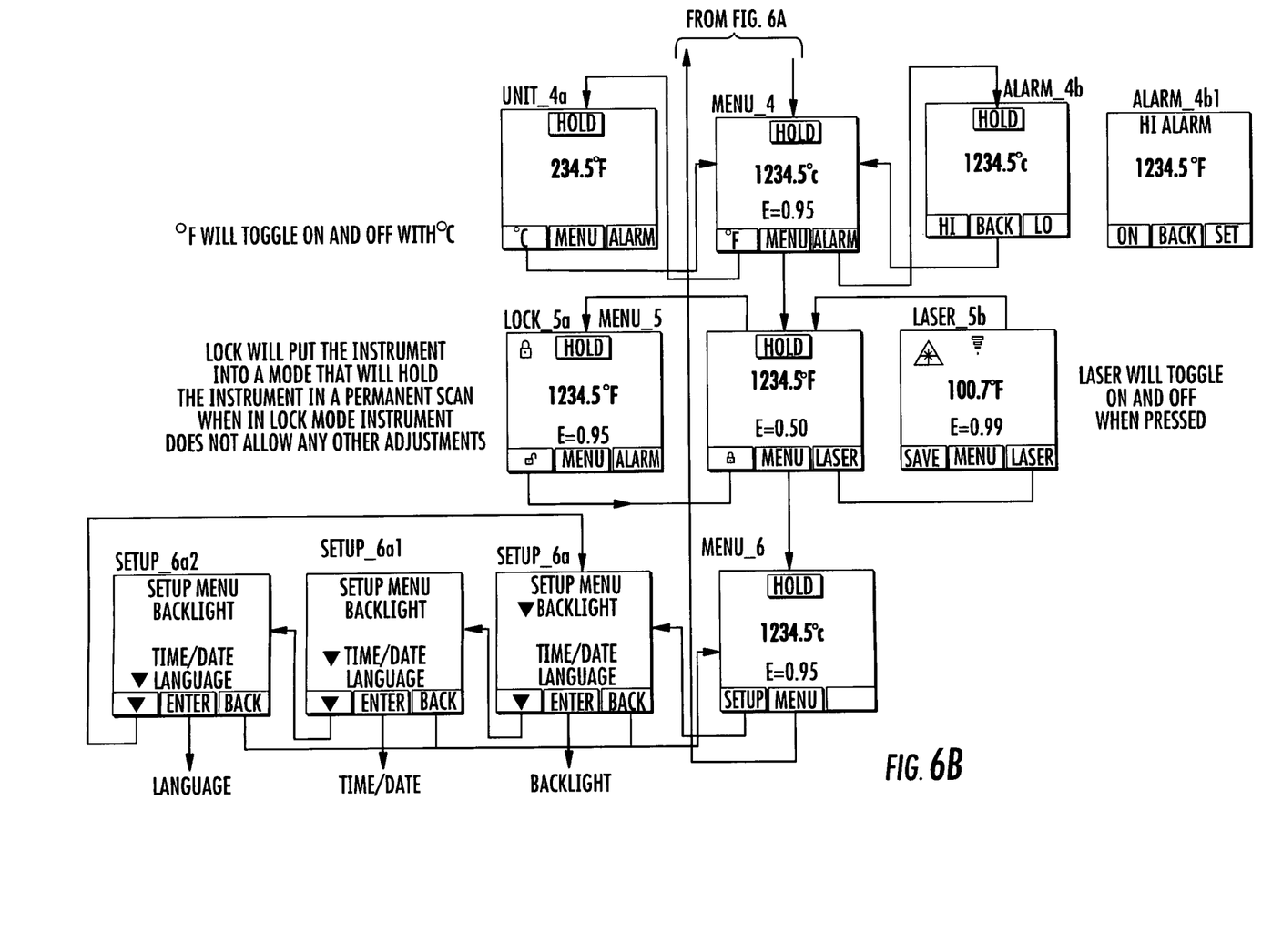
Figure 7:
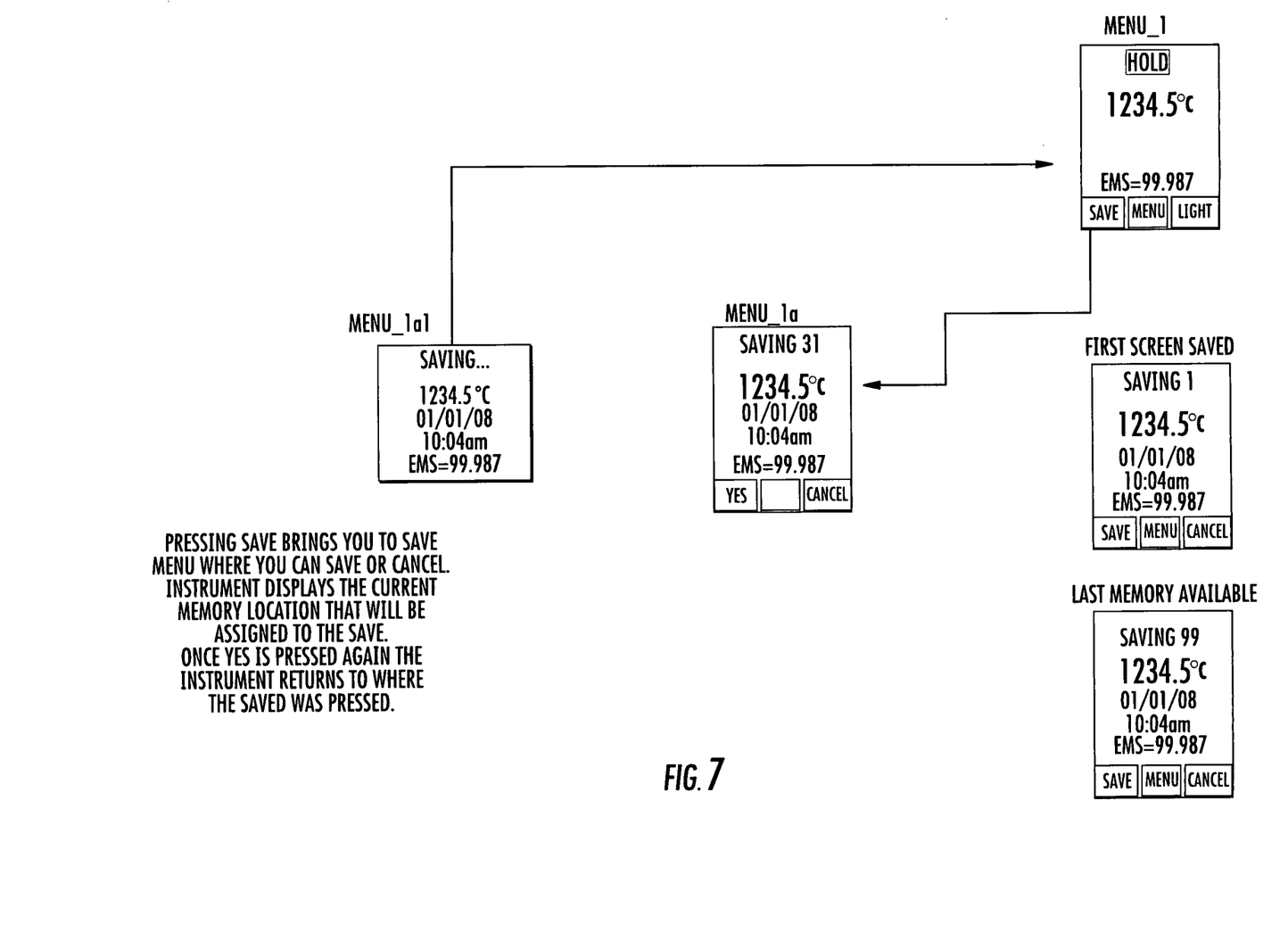
FIGS. 7-14 show various sub-menus that may be accessed during use of the graphical user interface.

FIGS. 6A and B show a high level menu tree that may be implemented by the graphical user interface. The menu tree may be traversed by a user pressing buttons 20, 22 and 24 depending on the function displayed on the corresponding tabs. Beginning at Menu 1, for example, pressing the button corresponding to the "Save" tab brings the user to the Save menu (FIG. 7) where measurement data can be saved in the next memory location. Pressing "Cancel" brings the user back to Menu 1.

Figure 8:
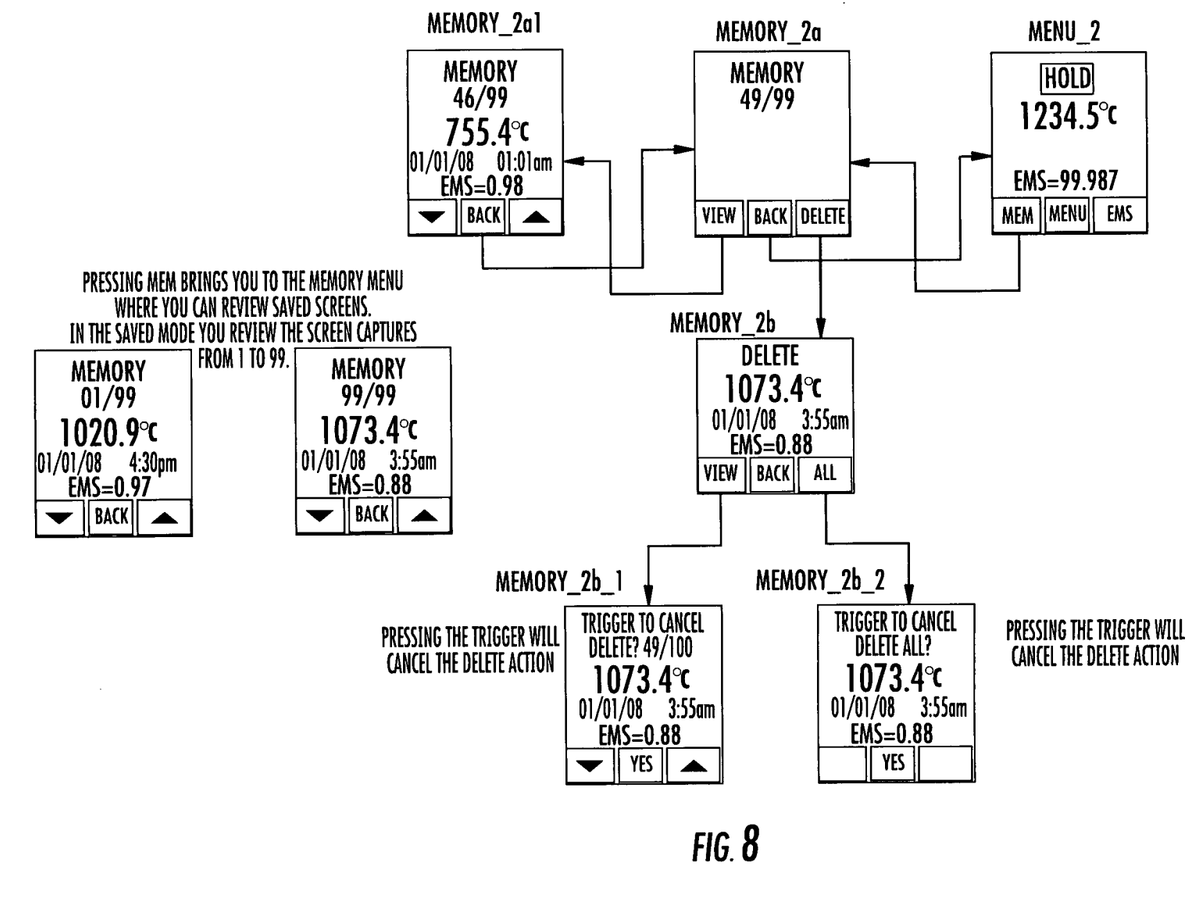

If the user presses the button corresponding to the "Menu" tab, the interface traverses the menu tree to Menu 2. If the button corresponding to the "Mem" tab is pressed in menu 2, the user is taken to the Memory menu (FIG. 8). In the Memory menu, the user can view or delete the data stored in each of the memory locations. Pressing the button corresponding to the "Back" tab will bring the user back to Menu 2.

Figure 9:
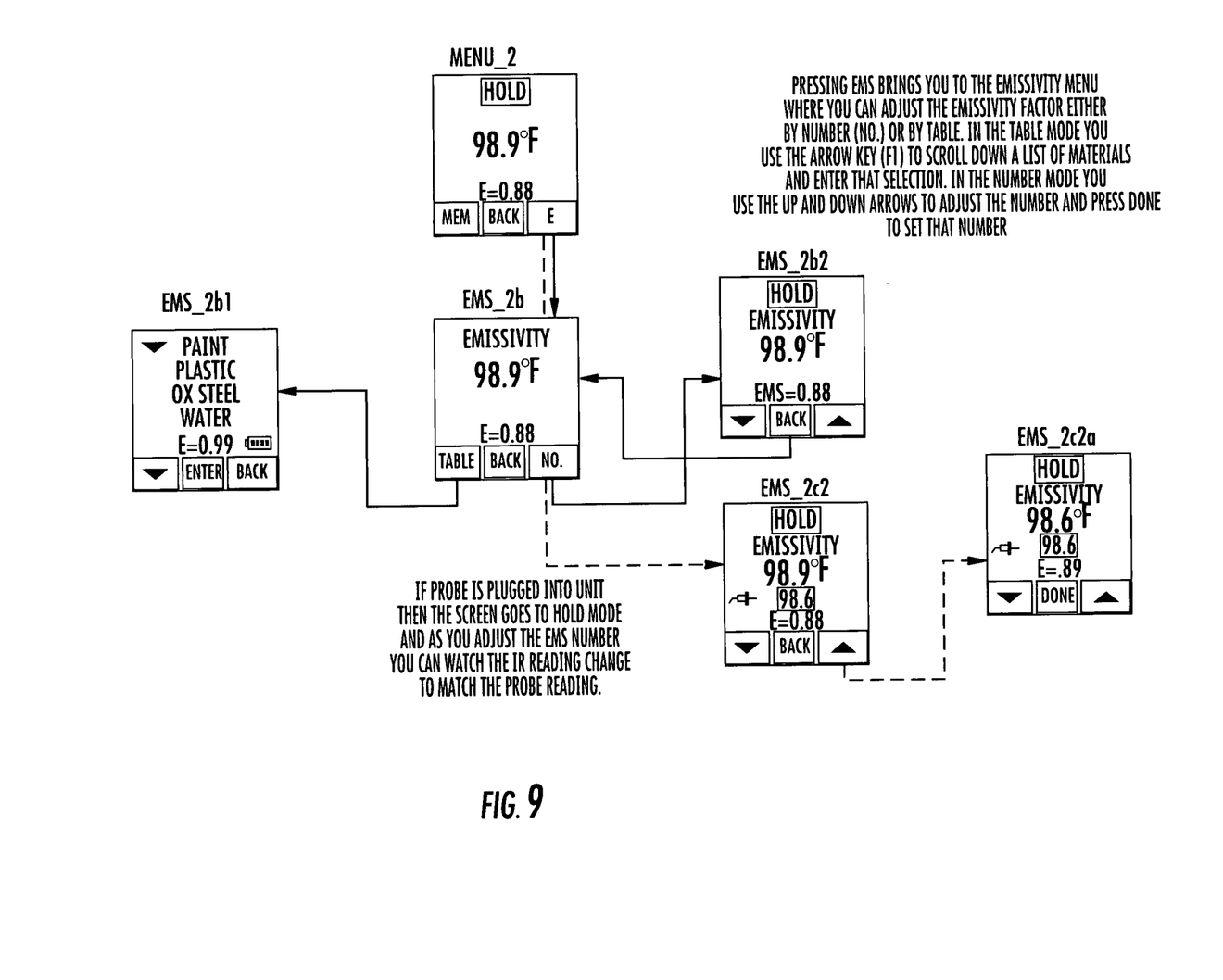

In Menu 2, the user may then press the button corresponding to the "EMS" tab to be taken to the Emissivity menu (FIG. 9). In the Emissivity menu, emissivity may be selected from a table stored in the instrument's memory or manually adjusted using up and down arrows. The contact thermometer may be used to allow the user to manually adjust emissivity until IR readings and probe readings are the same.

Figure 10:
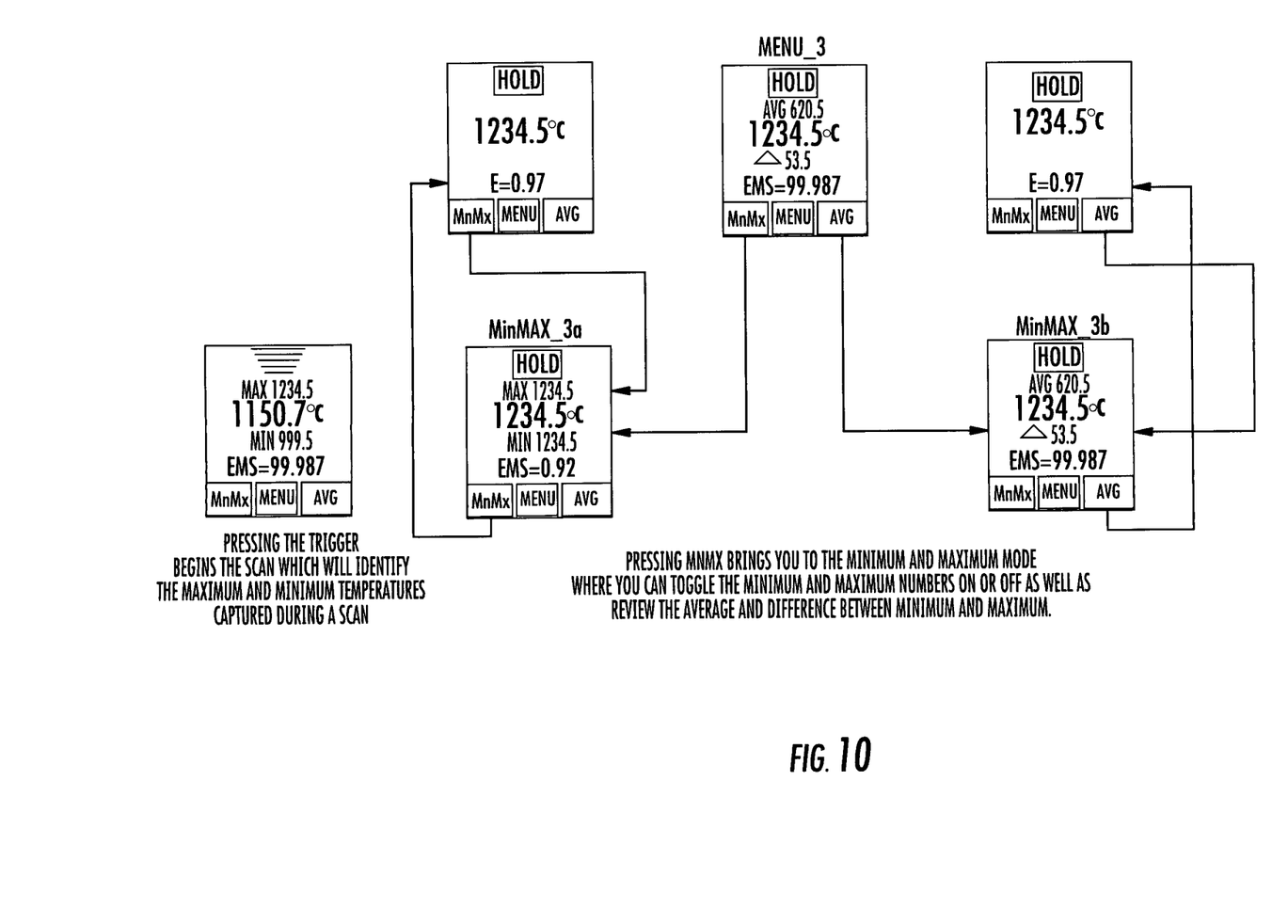

In Menu 2, pressing the button corresponding to the "Menu" tab brings up Menu 3 (FIG. 10). In Menu 3, the user may select the button corresponding to the "MnMx" tab. This will allow the maximum and minimum numbers shown on the display to toggle on or off. Pressing the button corresponding to the "Avg" tab would similarly allow the average and delta readings on the screen to be toggled on or off.

Figure 11:
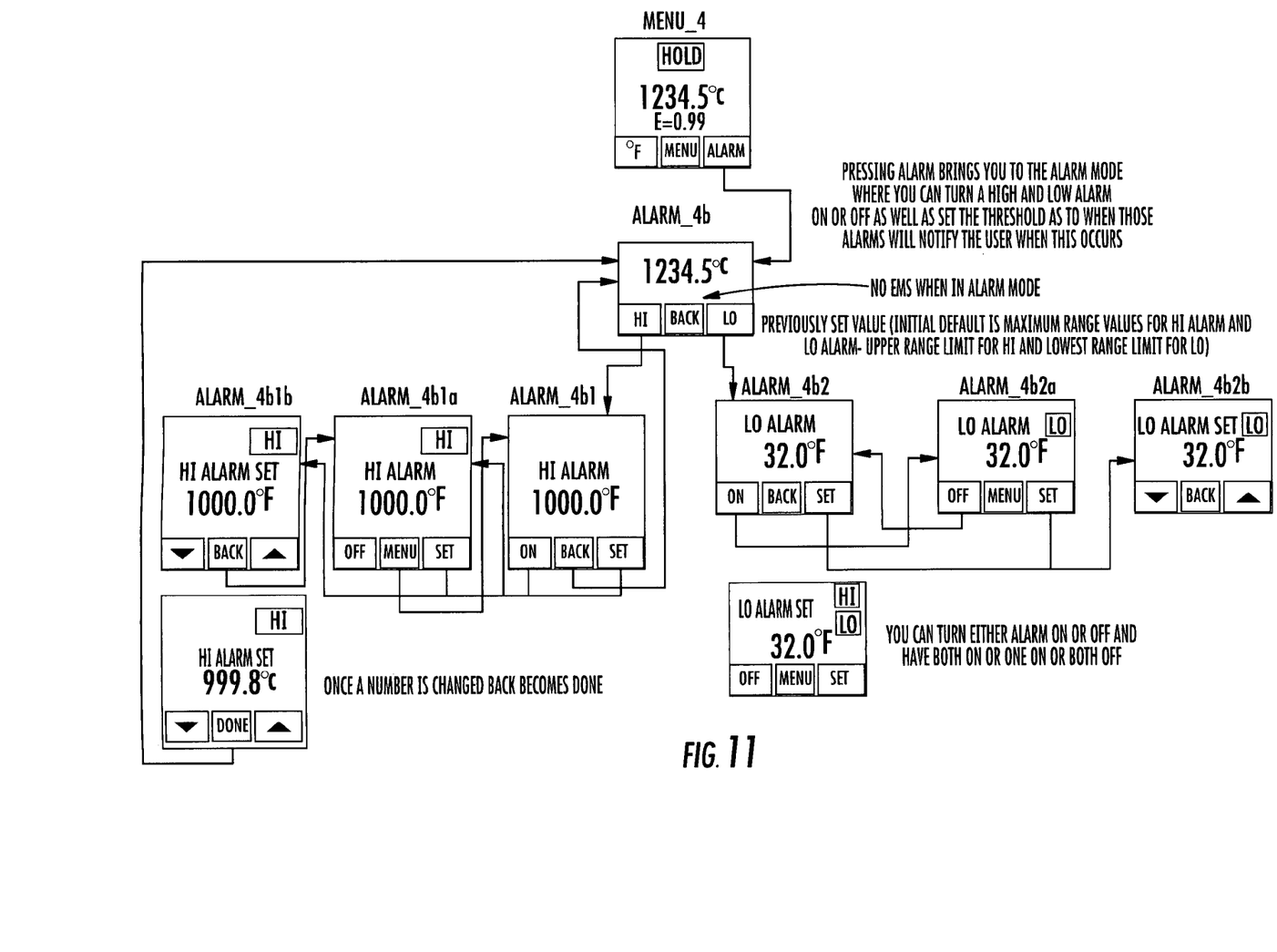

Pressing the button corresponding to the "Menu" tab when in Menu 3 will bring up Menu 4. Menu 4 includes a submenu (menu 4a) allowing the user to select between Fahrenheit and Celcius displays. Menu 4b (FIG. 11) allows the user to turn the high and low alarm on and off, as well as to set their respective numerical values.

Pressing the button corresponding to the "Menu" tab in Menu 4 will take the user to Menu 5. Menu 5 allows the user to place the instrument into a "Lock" mode (Menu 5a) as well as to turn the laser pointer on and off (Menu 5b).

Figure 12:
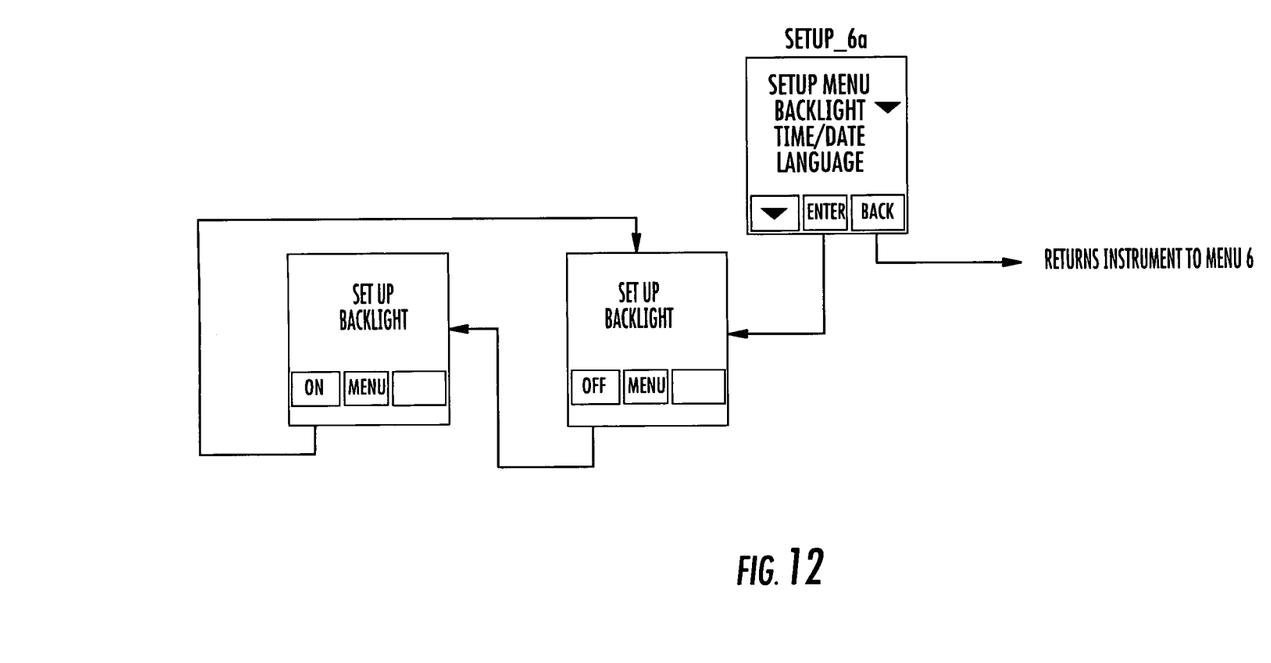
Figure 13:
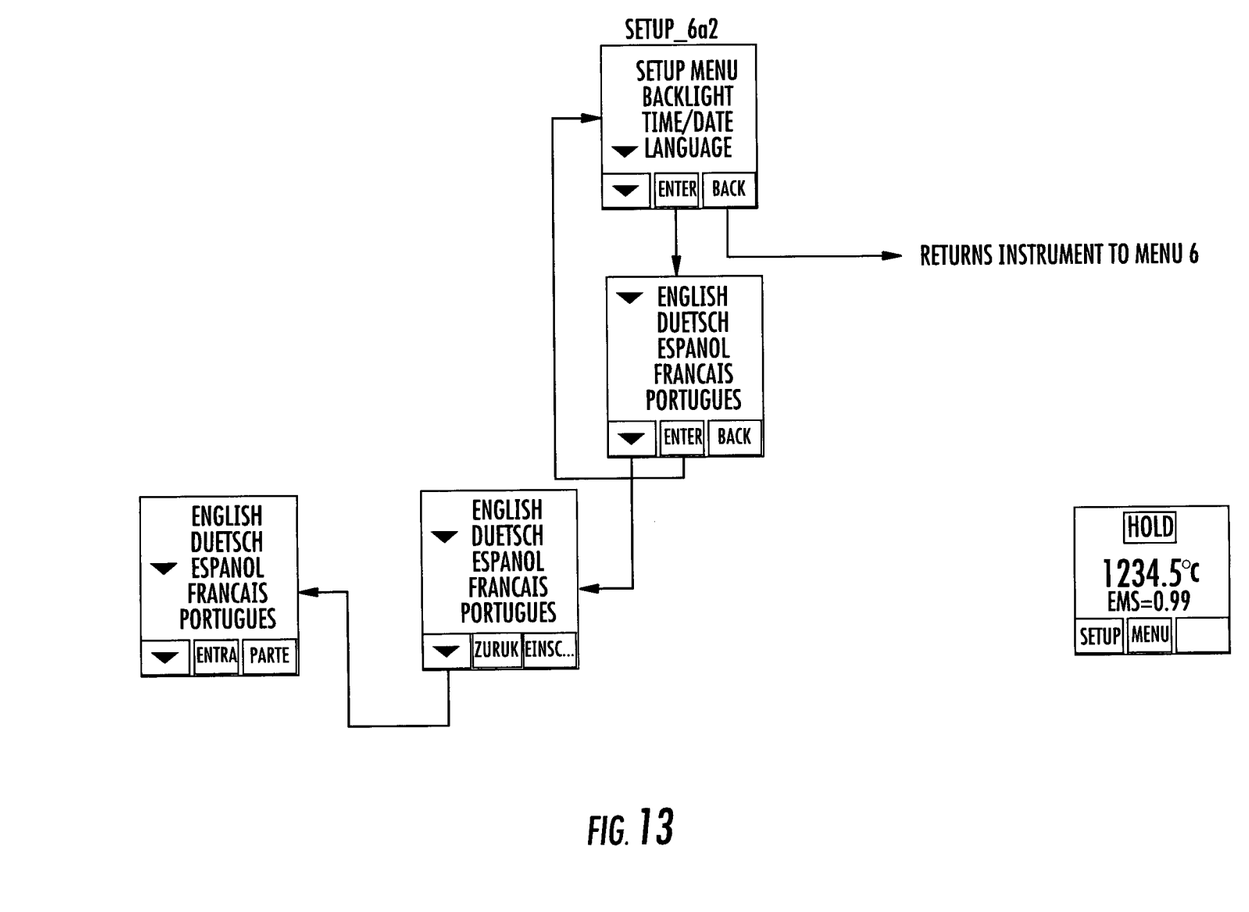
Figure 14:
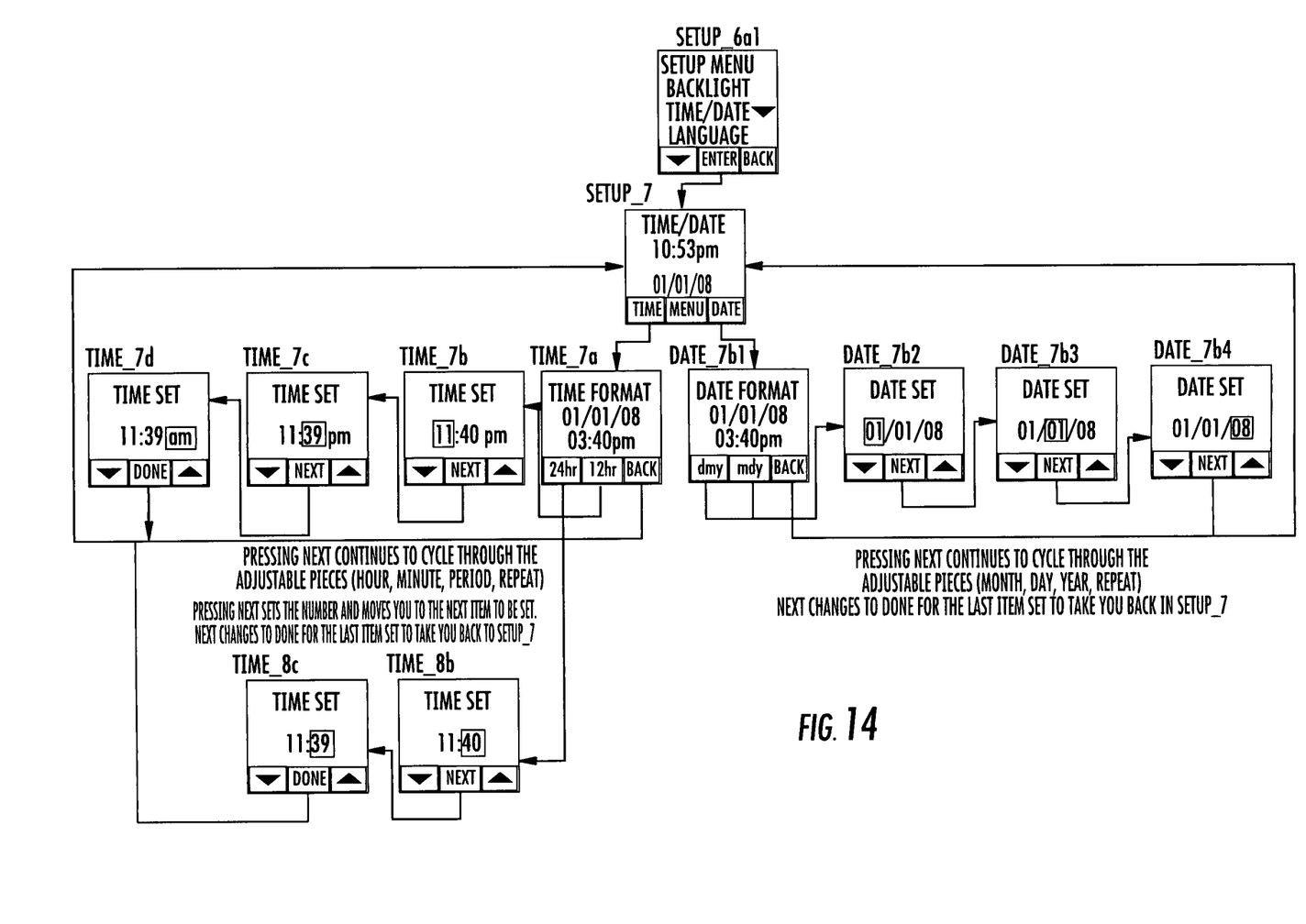

Pressing the button corresponding to the "Menu" tab in Menu 5 brings the user to Menu 6. In Menu 6, the user may access a Setup menu (Menu 6a) (FIG. 12) permitting adjustment of the display backlight for different conditions of ambient light, as well as to select the display language (FIG. 13) and set the time and date (FIG. 14).

Other details regarding the structure and operation of the graphical user interface will be apparent from the drawings.

It can thus be seen that the present invention provides a portable IR thermometer having a graphical display and user interface. While preferred embodiments of the invention have been shown and described, modifications and variations may be made thereto by those of ordinary skill in the art without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to be limitative of the invention as further described in the appended claims.

What is claimed is:

1. A portable noncontact thermometer comprising:
   a hand-held housing defining an aperture for ingress of incident thermal energy from a target location;
   a thermometer module including a noncontact thermal energy detector;
   said thermometer module further including a microcontroller operative to interpret electrical signals derived from an output of said noncontact thermal energy detector so as to determine temperature at said target location;
   a graphical display device fixed with respect to said housing capable of providing a graphical user interface having multiple screens variously showing one or more types of graphical items, wherein the types of graphical items comprise numbers, text, or functional icons;
   said graphical display device being a dot matrix display device having a plurality of pixels in rows and columns; and
   circuitry in electrical communication with said graphical display device so as to produce said graphical user interface such that a particular display area of the graphical display device is used to display different types of the one or more types of graphical items in different screens of said multiple screens,
   wherein a screen of said multiple screens displays a tab proximate to a function button in said plurality of function buttons indicating a function of the function button.

2. A portable noncontact thermometer as set forth in claim 1, further comprising a plurality of function buttons located on said housing adjacent to said graphical display device.

3. A portable noncontact thermometer as set forth in claim 2, wherein a function implemented by each of said function buttons varies in accordance with said multiple screens of said graphical user interface.

4. A portable noncontact thermometer as set forth in claim 3, wherein said multiple screens of said graphical user interface follow a menu tree selectable by a user.

5. A portable noncontact thermometer as set forth in claim 4, wherein said functional icons include icons indicating laser pointer activation and noncontact temperature measurement in progress.

6. A portable noncontact thermometer as set forth in claim 3, further comprising a memory having a plurality of memory locations in which respective temperature measurements may be stored, the contents of said memory locations being selectable using said graphical user interface.

7. A portable noncontact thermometer as set forth in claim 1, wherein said graphical user interface is adapted to display screens in a respective one of a plurality of languages as selected by a user.

8. A portable noncontact thermometer as set forth in claim 1, wherein said graphical user interface is adapted to show selected emissivity.

9. A portable noncontact thermometer as set forth in claim 1, wherein said graphical user interface is adapted to show alarm status.

10. A portable noncontact thermometer as set forth in claim 1, wherein said interface circuitry in electrical communication with said graphical display device includes said microcontroller.

11. A portable noncontact thermometer as set forth in claim 1, wherein said display device has at least 96 pixels in both directions.

12. A portable noncontact thermometer as set forth in claim 1, wherein at least a different screen of said multiple screens displays a different tab proximate to said function button indicating a different function of said function button.

13. A portable noncontact thermometer as set forth in claim 12, wherein said different tab on said different screen comprises a different word than said tab on said screen.

14. A portable noncontact thermometer as set forth in claim 12, wherein said function is performed based on pressing said function button when said graphical display device displays said screen, and said different function is performed based on pressing said function button when said graphical display device displays said different screen.

* * * * *